(12) United States Patent
Ikegami et al.

(10) Patent No.: US 11,285,458 B2
(45) Date of Patent: Mar. 29, 2022

(54) SEPARATING AGENT (71) Applicants: NATIONAL UNIVERSITY CORPORATION KYOTO INSTITUTE OF TECHNOLOGY, Kyoto (JP); DAICEL CORPORATION, Osaka (JP)

(72) Inventors: Tohru Ikegami, Kyoto (JP); Yusuke Kawachi, Kyoto (JP); Akihiro Kunisawa, Kyoto (JP)

(73) Assignees: NATIONAL UNIVERSITY CORPORATION KYOTO INSTITUTE OF TECHNOLOGY, Kyoto (JP); DAICEL CORPORATION, Osaka (JP)

( * ) Notice: Subject to any disclaimer, the term of this patent is extended or adjusted under 35 U.S.C. 154(b) by 863 days.

(21) Appl. No.: 14/903,699

(22) PCT Filed: Jul. 8, 2014

(86) PCT No.: PCT/JP2014/068237
§ 371 (c)(1),
(2) Date: Jan. 8, 2016

(87) PCT Pub. No.: WO2015/005361
PCT Pub. Date: Jan. 15, 2015

(65) Prior Publication Data
US 2016/0168302 A1    Jun. 16, 2016

(30) Foreign Application Priority Data

Jul. 8, 2013  (JP) .............................. JP2013-142550

(51) Int. Cl.
| | | |
|---|---|---|
| C08F 292/00 | (2006.01) |
| B01J 20/286 | (2006.01) |
| C08F 20/60 | (2006.01) |
| C08F 20/54 | (2006.01) |
| B01J 20/289 | (2006.01) |
| B01J 20/32 | (2006.01) |
| B01D 15/30 | (2006.01) |
| C08F 220/58 | (2006.01) |
| C08F 220/60 | (2006.01) |

(52) U.S. Cl.
CPC ........... B01J 20/286 (2013.01); B01J 20/289 (2013.01); B01J 20/3204 (2013.01); B01J 20/327 (2013.01); C08F 20/54 (2013.01); C08F 20/60 (2013.01); C08F 292/00 (2013.01); B01D 15/305 (2013.01); B01J 2220/82 (2013.01); C08F 220/585 (2020.02); C08F 220/606 (2020.02)

(58) Field of Classification Search
CPC .... B01J 20/286; B01J 20/289; B01J 20/3204; B01J 20/327; B01J 2220/82; C08F 20/54; C08F 20/60; C08F 292/00; C08F 2220/585; B01D 15/305; C07D 257/06
USPC ...................................................... 526/257
See application file for complete search history.

(56) References Cited

U.S. PATENT DOCUMENTS

| | | |
|---|---|---|
| 4,381,239 A | 4/1983 | Chibata et al. |
| 4,835,058 A | 5/1989 | Komiya et al. |
| 5,453,186 A | 9/1995 | Mueller et al. |
| 5,502,022 A | 3/1996 | Schwarz et al. |
| 2006/0128917 A1 | 6/2006 | Klaerner et al. |
| 2009/0294362 A1 | 12/2009 | Persson et al. |
| 2012/0095165 A1* | 4/2012 | Rees ........................ B01J 20/26 525/54.1 |

FOREIGN PATENT DOCUMENTS

| | | |
|---|---|---|
| CN | 101837284 A | 9/2010 |
| EP | 2 570 182 A1 | 3/2013 |
| FR | 2 631 849 A1 | 12/1989 |
| JP | 2504005 B | 5/1988 |
| JP | 10-500615 A | 1/1998 |
| JP | 2009-244252 A | 10/2009 |

(Continued)

OTHER PUBLICATIONS

Taden et al (Synthesis and polymerization of 5-(methacrylamido)tetrazole, a water soluble acidic monomer, Journal of Polymer Science, vol. 40, 4333-4343, 2002). (Year: 2002).*

Turan et al (Synthesis, characterization and application of a chelating resin for solid phase extraction of some trace metal ions from water, sediment and tea samples, Reactive & Functional polymers 72 (2012) 722-728 (Year: 2012).*

(Continued)

Primary Examiner — Wenwen Cai
(74) Attorney, Agent, or Firm — Flynn Thiel, P.C.

(57) ABSTRACT

A separating medium for hydrophilic interaction chromatography useful in separating hydrophilic compounds. The hydrophilic interaction chromatography separating medium, which is formed from a support and a ligand carried by the support, is a separating medium wherein the ligand is a (meth)acrylic polymer having a constituent unit derived from the compound indicated by formula (I).

(I)

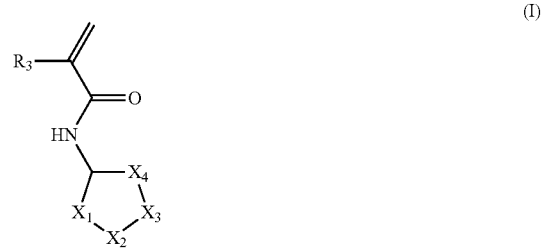

5 Claims, 8 Drawing Sheets (56) References Cited

FOREIGN PATENT DOCUMENTS

| WO | WO 2004/002618 A1 | 1/2004 |
|---|---|---|
| WO | WO 2010/118985 A1 | 10/2010 |
| WO | WO 2011/012302 A1 | 2/2011 |

OTHER PUBLICATIONS

Sinirlioglu et al (Novel membranes based on poly(5-(methacrylamido)tetrazole) and sulfonated polysulfone for proton exchange membrane fuel cells, Journal of Applied polymer science 2014, DOI:10.1002/APP.40107 (Year: 2013).*
Chinese Office Action dated Mar. 6, 2017 which issued in corresponding Chinese Patent Application No. 201480038929.1, including a machine translation thereof (11 pages).
International Search Report for PCT/JP2014/068237 (2 pgs.).
Speciation of Chromium in Water Samples by Solid-Phase Extraction on a New Synthesized Adsorbent, by O. Hazer et al, Analytical Sciences, vol. 29., Jul. 2013, pp. 729-734.
Five-membered Mercaptoheterocyclic Ligands for Thiophilic Adsorption Chromatography, by A. Schwarz, Journal of Molecular Recognition, vol. 9, 1996, pp. 672-674.
Tetrazole-Functionalized Silica for Hydrophilic Interaction Chromatography of Polar Solutes, by X. Dai et al, Chromatographia, vol. 73, 2011, pp. 865-870.
Retention and selectivity of stationary phases for hydrophilic interaction chromatography, by Y. Guo et al, Journal of Chromatography, vol. 1218, 2011, pp. 5920-5938.
Chinese Office Action for corresponding application No. 201480038929.1, dated Sep. 19, 2016, including English-language translation (14 pages).
European Search Report dated Jun. 27, 2016 (13 pgs.).
Database WPI Week 199208 Thomson Scientific, London, GB; AN 1992-062880 (English abstract of SU 1650592 A1).
Synthesis of polyacrylaminoimidazole chelating fiber and properties of concentration and separation of trace Au, Hg and Pd from samples, by B. Gong, Talanta, vol. 57, 2002, pp. 89-95.
Synthesis and Polymerization of 5-(Methacrylamido)tetrazole, a Water-Soluble Acid Monomer, by A. Taden et al, Journal of Polymer Science: Part A: Polymer Chemistry, vol. 40, 2002, pp. 4333-4343.
English translation of the International Preliminary Report on Patentability and Written Opinion of the International Searching Authority for PCT/JP2014/068237 (6 pgs.).
D3: Alan Tominey, et al., Chem. Commun., 2006, pp. 2492-2494 (3 pages).

* cited by examiner

Order
1: Guanine (Toluene)
2: Uracil
3: Adenine
4: Adenosine
5: Uridine
6: Cytsine
7: Cytidine
8: Guanosine

SEPARATING AGENT

TECHNICAL FIELD

The present invention relates to a separating medium for chromatography, and relates especially to a separating medium for hydrophilic interaction liquid chromatography, to be used for separating hydrophilic substances.

BACKGROUND ART

High performance liquid chromatography (HPLC) is an analytical technique that is applied in a variety of fields including life sciences and medicine, and in recent years there has been demand in particular for higher degrees of separation and greater performance at higher speeds. HPLC includes various separation modes, but one mode that is currently popular in HPLC analysis is reversed-phase liquid chromatography (RPLC). However, many of the bioactive substances, metabolites and the other substances, which are important in the life science fields, are highly polar and hydrophilic compounds, and these hydrophilic compounds are poorly retained in RPLC, making separation difficult. Hydrophilic interaction liquid chromatography (HILIC) has been proposed for separating such compounds (Non-patent Document 2). HILIC is a kind of normal-phase liquid chromatography (NPLC), but differs from ordinary NPLC in that a mixture of an organic solvent with water or a buffer solution is used as the solvent in the mobile phase. It is difficult to dissolve hydrophilic compounds in ordinary NPLC because a less-water-soluble solvent is used in the mobile phase. Because a water-based mobile phase is used in HILIC, however, it is suited to separation of hydrophilic compounds that are not eluted under normal-phase conditions.

Patent Document 1 describes a separating medium using a silica gel support, and having a structure derived from acrylamide as a ligand, which is bound to the support.

Patent Document 2 describes a separating medium comprising a supported polymer obtained by polymerizing vinyltetrazole.

Non-patent Document 1 describes nitrile-modified silica modified with tetrazole as a separating medium for hydrophilic interaction chromatography.

Patent Document 1: Japanese Patent No. 2504005
Patent Document 2: Chinese Patent No. 101837284
Non-patent Document 1: Chromatographia, 73, 865-870 (2011)
Non-patent Document 2: J. Chromatography. A, 1218, 5920-5938 (2011)

DISCLOSURE OF THE INVENTION

The separating media described in Patent Documents 1 and 2 and Non-patent Document 1 are not particularly hydrophilic, leaving room for improvement. The present invention provides a new separating medium (separating agent) for hydrophilic interaction chromatography.

The inventors focused on ion interactions and hydrogen bonding of constituent units derived from compounds represented by Formula (I), such as tetrazole.

The present invention as described below was perfected based on the discovery that a separating medium comprising a supported ligand obtained by synthesizing a (meth)acrylic monomer having such a constituent unit, and then polymerizing that (meth)acrylic monomer, has superior retention characteristics for specific compounds in comparison with conventional commercial separating media for hydrophilic interaction chromatography.

[1] A separating medium for hydrophilic interaction chromatography, being formed from a support (carrier) and a ligand supported on the support, wherein the ligand is a (meth)acrylic polymer having a constituent unit derived from a compound represented by Formula (I) below:

[C1]

(I)

In Formula (I), there are one or two double bonds between atoms making up a heterocyclic ring, $X_1$ is selected from the group consisting of S, $SCH_3^+$, O, NH, $NCH_3$, $CH_2$, CHR and $CR_1R_2$, each of $X_2$, $X_3$ and $X_4$ is selected from the group consisting of N, NH, $NCH_3$, $CH_2$, CHR, $NCH_3^+$, CH, CR and $CR_1R_2$ (in which each of $R_1$ and $R_2$ is a substituted or non-substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group, while R is an substituted or non-substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group), at least two of $X_1$, $X_2$, $X_3$ and $X_4$ are not $CH_2$, CH, CR or $CR_1R_2$, and $R_3$ is H or $CH_3$.

[2] The separating medium according to [1], wherein the ligand is a (meth)acrylic polymer having a constituent unit derived from a compound selected from the group consisting of aminoimidazole, aminoimidazoline, aminothiazole, aminotriazole, aminotetrazole, aminothiadiazole and aminomethylimidazole.

[3] The separating medium according to [1], wherein the ligand is a (meth)acrylic polymer having a constituent unit derived from aminotetrazole.

[4] The separating medium according to [1], wherein the ligand is a methacrylic polymer having a constituent unit derived from aminotetrazole.

[5] The separating medium according to any of [1] to [4], wherein the support is a silica gel or silica monolith.

The separation medium of the present invention is formed by supporting a (meth)acrylic polymer having a constituent unit derived from a compound represented by Formula (I) above on a support. A new separating medium useful for separating specific hydrophilic compounds is provided by the present invention.

MODE FOR CARRYING OUT THE INVENTION

<Ligand Supported on the Separating Medium of the Invention>

The separating medium of the invention is formed by supporting a ligand comprising a constituent unit derived from a compound represented by Formula (I), contained in a (meth)acrylic polymer.

In the present invention, the term "(meth)acrylic" encompasses both "methacrylic" and "acrylic".

[C2]

(I)

In Formula (I), there are one or two double bonds between atoms making up the heterocyclic ring, $X_1$ is selected from the group consisting of S, $SCH_3^+$, O, NH, $NCH_3$, $CH_2$, CHR and $CR_1R_2$, each of $X_2$, $X_3$ and $X_4$ is selected from the group consisting of N, NH, $NCH_3$, $CH_2$, CHR, $NCH_3^+$, CH, CR and $CR_1R_2$ (in which each of $R_1$ and $R_2$ is an optionally substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group, while R is a substituted or non-substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group), at least two of $X_1$, $X_2$, $X_3$ and $X_4$ are not $CH_2$, CH, CR or $CR_1R_2$, and $R_3$ is H or $CH_3$.

In Formula (I), each of $X_1$, $X_2$, $X_3$ and $X_4$ is preferably selected from S, N, O, NH, $NCH_3$ and $CH_2$, and is more preferably selected from S, N and NH.

Because the constituent unit derived from the compound represented by the Formula (I) is contained in the (meth)acrylic polymer ligand, the ability of the separating medium to retain hydrophilic compounds is influenced by the effects of ion interactions and hydrogen bonding by the constituent units derived from the Formula (I).

In particular, when a compound having a nitrogen atom in the heterocyclic ring is used as the compound represented by the Formula (I), this nitrogen atom acts as a hydrogen bonding receptor, influencing the retention of hydrophilic compounds.

Of the aforementioned compounds, the (meth)acrylamide tetrazoles are compounds containing 4 nitrogen atoms in a ring, and are acidic compounds that are resonance-stabilized by deprotonation. The nitrogen atoms on the tetrazole also function as receptors for hydrogen bonding.

A commercial product may be used as the compound represented by the Formula (I), or it may be synthesized by known methods.

The compound represented by the Formula (I) may be obtained for example by reacting a compound represented by Formula (II) below and (meth)acryloyl chloride in a solvent such as tetrahydrofuran for example, to obtain a (meth)acrylamide monomer having the structure represented by the Formula (I). The (meth)acryloyl chloride itself may be either methacryloyl chloride or acryloyl chloride.

[C3]

(II)

(In the Formula (II) there are one or two double bonds between atoms making up the heterocyclic ring, $X_1$ to $X_4$ are the same as in the Formula (I), and $R_3$ represents a hydrogen atom or methyl).

The following are specific examples of the compound represented by the Formula (II): aminotetrazoles such as 5-aminotetrazole, aminoimidazoles such as 2-aminoimidazole, aminoimidazolines such as 2-amino-2-imidazoline, aminothiazoles such as 2-aminothiazole, aminotriazoles such as 3-amino-1,2,4-triazole, and 4-amino-1,2,4-triazole, aminothiadiazoles such as 2-amino-1,3,4-thiadiazole, and aminomethylimidazoles such as 2-amino-1-methyl-1H-imidazole.

Because a polymerizable functional group and a heterocyclic ring are bonded via an amide bond in the (meth)acrylamide monomer of the Formula (I) above, the (meth)acrylic polymer obtained by polymerizing this monomer has this heterocyclic ring bonded to the main chain via amide bonds.

A ligand comprising a constituent unit derived from the compound represented by Formula (I) contained in a (meth)acrylic polymer can be obtained by radical polymerization of this (meth)acrylamide monomer.

Radical polymerization of this (meth)acrylamide monomer undergoes by free radical manner. By contrast, the polymer described in Patent Document 2 is polymerized by atom transfer radical polymerization (ATRP), and a copper complex is used as a catalyst in this polymerization method. With this method, copper ions or other metal ions may remain on the supports, and these metal ions may adversely affect separation of the target substance. In the present invention, problems caused by residual metal ions do not occur because radical polymerization is performed without using any metal catalysts.

In addition to the constituent unit represented by the Formula (I), the supported ligand in the separating medium of the present invention may also contain constituent units derived from other compounds as long as these do not detract from the effects of the invention.

In this case, the ratio of the constituent unit represented by the Formula (I) is preferably at least 90 mol %.

As discussed below, polymerization of the compound represented by the Formula (I) may be performed in the presence of the support or separately from the support. When polymerization is performed in the presence of the support, the separating medium may be of the chemical binding type, while when polymerization is performed separately from the support, a separating medium of the physical adsorption type may be prepared.

For purposes of separating hydrophilic compounds, the number-average molecular weight (Mn) and weight-average molecular weight (Mw) of the (meth)acrylic polymer are preferably as large as possible, and are preferably in the range of 5000 to 20000. The molecular weight distribution (Mw/Mn) of the (meth)acrylic polymer is not particularly limited, but may be 1.0 to 5.0.

Giving the (meth)acrylic polymer a high molecular weight contributes to increasing the ability to retain hydrophilic compounds by increasing the ratio of the constituent unit derived from the compound represented by the Formula (I) in the separating medium.

The hydrophilicity of a separating medium comprising this (meth)acrylic polymer supported on a support (discussed below) can be adjusted by varying the polymerization conditions.

By lowering the polymerization temperature during polymerization or adding a RAFT reagent for example, it is possible to increase the hydrophilicity of a separation medium comprising the resulting polymer supported on a support gel.

The Mn, Mw and Mw/Mn of the (meth)acrylic polymer can be determined by size exclusion chromatography (SEC).

The Mn and Mw of the (meth)acrylic polymer can be adjusted by changing the molar ratio of the polymerization initiator used in the polymerization process (discussed below) and the monomer within the range of 10 to 1000. A chain transfer agent may also be used to lower the molecular weight. Dithiocarboxylic acid derivatives that are water-soluble RAFT agents may be used as the chain transfer agent, for example.

For example, the Mn and Mw of the polymer can be increased by increasing the molar ratio of the polymerization monomer to the initiator.

Ammonium persulfate for example may be used as the polymerization initiator.

The separating medium of the present invention is formed with a ligand containing a constituent unit derived from the compound represented by the Formula (I), which is supported on a support.

The mode of supporting on the support may be physical adsorption or chemical bonding for example.

When supporting on the support is by physical adsorption, a ligand having a constituent unit derived from the compound represented by the Formula (I) may be first dissolved in a suitable solvent, after which the solution is coated on the support described below, and the solvent is removed to thereby coat the polymers on the support.

The support on which the ligand is supported by physical absorption may be one that can be contained in a column tube, and that has chemical and physical resistance for separation. A known support may be used, and examples include silica, alumina, magnesia, glass, kaolin, titanium oxide, silicate salts, hydroxyapatite and other inorganic supports, and polystyrene, polyacrylamide, polyacrylate and other organic supports.

For purposes of increasing the ability to separate the target substance, the support is preferably porous. The support may be a particulate support or an integrated support contained as a unit in the column tube, but a particulate support is preferable for ease of manufacture and handling of the separating medium. A specific example of such a support is a silica gel.

When supporting on the support is by chemical bonding, the following method may be used for example.

The support is first surface treated. For example, when a silica gel is used as the support, a compound obtained by reacting an acrylic monomer and a silane coupling agent can be used as a spacer, and treated with the silica gel.

A compound that can be used as a spacer can be obtained for example by reacting (meth)acryloyl chloride with an aminoalkylalkoxysilane. The number of carbon atoms in the alkyl group of the aminoalkyl alkoxysilane may be 1 to 5 for example, and the number of carbon atoms in the alkoxy group may be 1 to 3. A specific example of an aminoalkylalkoxysilane is 3-aminopropyltriethoxysilane.

When methacryloyl chloride and 3-aminopropyltriethoxysilane are treated in a solvent such as THF in the presence of triethylamine, the product is 3-methacrylamidopropyltriethoxysilane.

The alkoxy groups of a spacer obtained in this way react with the silica gel, bonding the spacer to the silica gel.

A (meth)acrylic polymer having a constituent unit derived from the compound represented by the Formula (I) is bonded chemically to the silica gel support by a polymerization reaction involving both a (meth)acrylamide monomer represented by the Formula (I) above and a silica gel having bonded thereto a spacer with double bonds derived from an acrylic monomer. Water/pyridine or a dimethylformamide (DMF) solvent that dissolves the (meth)acrylamide monomer represented by the Formula (I) may be used as the solvent for polymerization.

The concentration of the (meth)acrylamide monomer represented by the Formula (I) in this case may be about 50 to 800 mg/mL. Using methacrylamide tetrazole the concentration may be about 50 to 500 mg/mL, while using other acrylamide monomers it may be 300 to 600 mg/mL for example. The hydrophilic group selectivity or hydrophobic selectivity of the resulting separating medium can be increased by increasing the concentration of the monomer during polymerization. The reaction temperature may be 20 to 100° C., and the reaction time may be about 1 to 24 hours.

Even if a silica gel is not used as the support, chemical bonding to the support can still be achieved by bonding a spacer having a vinyl or other polymerizable functional group to the support surface, and causing a polymerization reaction involving those polymerizable functional groups and the polymerizable functional groups of the (meth)acrylamide monomer represented by the Formula (I).

For ease of surface treatment, a support having silanol groups on the support surface is preferred.

Silane coupling agents that can be used for the spacer include vinylmethylchlorosilane, vinyldimethylethoxysilane, vinylethyldichlorosilane, vinylmethyldiacetoxysilane, vinylmethyldiethoxysilane, 1-vinylsilatrane, vinyl triacetoxysilane, vinyltrichlorosilane, vinyltrimethoxysilane, vinyltriphenoxysilane, vinyltris(2-methoxyethoxy)silane, vinyltriisopropoxysilane, styrylethyl trimethoxysilane, methacryloxypropyldimethylchlorosilane, 3-methacryloxypropylmethyldiethoxysilane, 3-methacryloxypropyl trimethoxilane, 3-methacryloxypropyltris(methoxyethoxy) silane, 3-acryloxypropyltrimethoxysilane, 3-acryloxypropylmethyl dimethoxysilane, 1,3-divinyl-1,3-dimethyl-1,3-dichlorodisiloxane, 1,3-divinyltetraethoxydisiloxane, 1,3-divinyltetramethyldisilazane and any other agent like them.

The particle diameter of the support is normally 3 to 15 gm regardless of whether the ligand is supported on the support by physical adsorption or chemical bonding.

The supported amount of the ligand on the support is normally 10 to 30 parts by weight or preferably 15 to 25 parts by weight per 100 parts by weight of the total separating medium.

A monolithic support may also be used, and examples of such a monolithic supports include silica monoliths that can be obtained by sol-gel processes caused by hydrolysis and polycondensation of alkoxysilanes as shown by the reaction formulae below for example.

$$Si(OR)_4 + H_2O \rightarrow Si(OH)(OR)_3 + ROH$$

$$Si—OH + Si—OH \rightarrow Si—O—Si + H_2O$$

$$Si—OH + Si—OR \rightarrow Si—O—Si + ROH$$

The hydrolysis and polycondensation of the alkoxysilane may be performed for example in a capillary column depending on the form of column used.

The alkoxy groups of the alkoxysilane may have about 1 to 5 carbon atoms, and desirable examples include methoxy and ethoxy groups.

It is also possible to use the continuous inorganic porous material (monolithic support) described in Japanese Patent Application Laid-open No. 2006-150214, which has macropores and medium pores formed on the inner walls of the macropores.

An example of a capillary column is a fused silica capillary column. The fused silica capillary column may be prepared by known methods, or obtained by treating the inner walls of a commercially available column.

Known conditions may be used for the silica sol-gel reaction.

Apart from silica monoliths, known polymer monoliths may also be used as monolithic columns.

When using such a polymer monolith, it may be used with a polymer having a constituent unit derived from the compound represented by the Formula (I) supported thereon by physical adsorption.

When using a silica monolith, the method of supporting on the monolith may be by chemical bonding as discussed above.

Specifically, using a pre-prepared silica monolith, a compound obtained by reacting an acrylic monomer and a silane coupling agent is used as a spacer, and reacted with the silica monolith. For example, 3-methacrylamidopropyl triethoxysilane is obtained by reacting 3-aminopropyltriethoxysilane and methacryloyl chloride.

The alkoxy groups of the resulting spacer are treated with the silica gel to bond the spacer onto the silica gel.

Causing a polymerization reaction involving both a (meth)acrylamide monomer represented by the Formula (I) above and a silica monolith having bonded thereto a spacer having double bonds derived from an acrylic monomer serves to chemically bond a (meth)acrylic polymer having a constituent unit derived from the compound represented by Formula (I) to a silica monolith (support).

In this case, the concentration of the (meth)acrylamide monomer may be about 50 to 800 mg/mL. If methacrylamide tetrazole is used, it may be about 50 to 500 mg/mL, while the concentrations of other acrylamide monomers may be 300 to 600 mg/mL for example. The selectivity for hydrophilic group or selectivity for hydrophobic group, by the resulting separating medium can be increased by increasing the concentration of the monomer during polymerization. The reaction temperature may be 20 to 100° C., and the reaction time may be about 1 to 24 hours, for example.

EXAMPLES

The present invention is explained in more detail based on examples, but the present invention is not limited to the descriptions of the examples as long as the scope of the invention is not exceeded.

Examples of the present invention are given below.

1. Synthesis of 5-methacrylamido-1H-tetrazole
<Experimental Procedure>

(1) 3.79 mL of methacryloyl chloride was added dropwise over 30 minutes to a solution of 3.09 g of 5-amino-1H-tetrazole, 90 mL of tetrahydrofuran and 11.4 mL of water, 90 mL of water was added after 3 hours, and the mixture was stored under refrigeration.

(2) The solution was suction filtered, and the white solid on the filter paper was vacuum dried.

Synthesis of 5-methacrylamido-1H-tetrazole
<Results>

Figure 1:
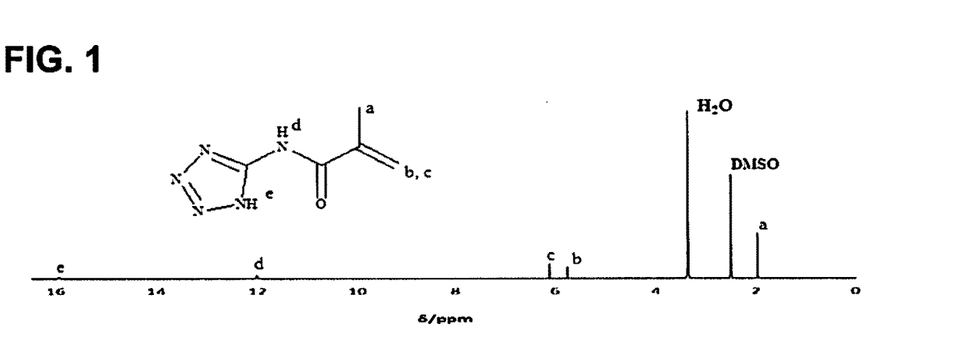
FIG. 1 shows the results of $^1$H NMR measurement of a methacrylamide monomer prepared in an example.
Figure 2:
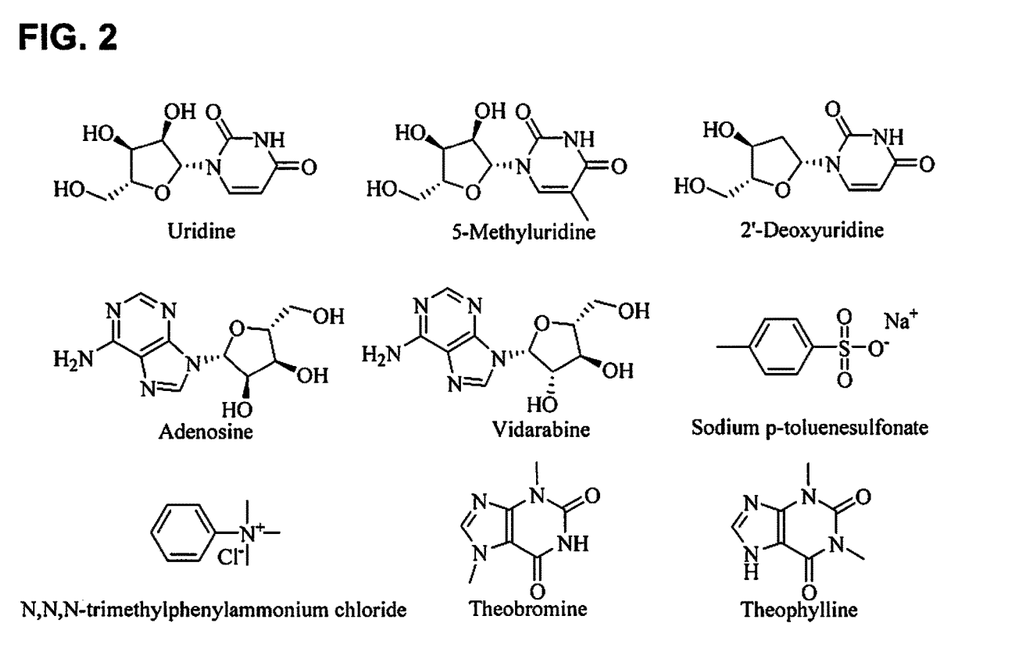
FIG. 2 shows the structures of compounds used in column tests.

The $^1$H NMR measurement results for the prepared (meth)acrylamide monomer are shown in FIG. 1. The yield was 70%.

2. Synthesis of Tetrazole-Containing Polymer-Modified Stationary Phase (PTz)

2-1. Synthesis of 3-methacrylamidopropyltriethoxysilane (MAS), and Supporting on Silica Gel
<Experimental Procedure>

(1) 11.09 g of 3-aminopropyltriethoxysilane was dissolved in 25 mL of THF, and 7.39 mL of triethylamine was added to the solution.

(2) 5.08 mL of methacryloyl chloride was added dropwise over 30 minutes with ice cooling.

(3) After 21 hours, the solution was suction filtered, concentrated by an evaporator, and vacuum dried (isolation of MAS).

(4) 60 mL of toluene was added to 13.67 g of dried silica gel, and the mixture was distilled at 120° C. (azeotrope).

(5) The MAS, 8.46 g of pyridine and hydroquinone were added and heated to reflux for 24 hours.

(6) After completion of reflux, the MAS bonded silica was suction filtered by using methanol, and the solid on the filter paper was dried (isolation of MAS—Si).

2-2. Synthesis of stationary phase by polymerization of methacrylamide monomer <Experimental Procedure>

(1) Using 400 to 1300 mg of methacrylamide monomer per 700 mg of MAS—Si, radical polymerization was performed for 3 hours at 60° C. in 5 mL of solvent. Ammonium persulfate was used as the initiator in all cases, and the solvent was water/pyridine=4/1.

(2) The polymer-coated media were suction filtered by using methanol and acetone, and the media were dried.

(3) The resulting media were packed in a stainless steel column using 20 mL of slurry solvent (methanol/water=4/1).

[C5]

5-Methacrylamido-1H-tetrazole → PTz

Synthesis of PTz Stationary Phase

3. Property Evaluation by Column Testing 3-1. Column Testing Methods

Column testing methods were used to evaluate each of the separating media listed in Table 2 for each of the items listed in Table 1.

Measurement Conditions

Mobile phase: α(AX), α(CX) . . . Acetonitrile(ACN)/AcONH$_4$ buffer (100 mM, pH 4.76)

Other . . . Acetonitrile (ACN)/AcONH$_4$ buffer (20 mM, pH 4.76)

Column temperature: 30° C.

Detector: UV 254 nm

<Results and Discussion>

Figure 3:
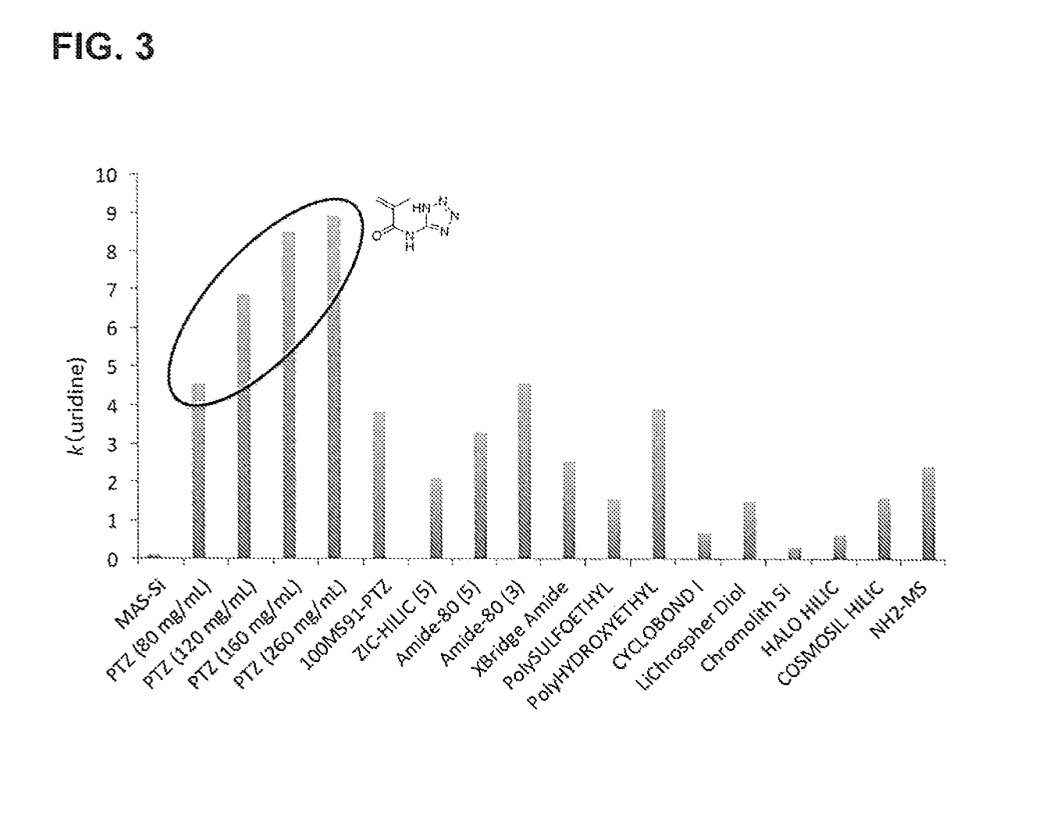
FIG. 3 shows the results of a comparison of the k(U) values of columns packed with the separating medium of the present invention and commercially available separating media.

The measurement results for the columns of the examples (hereunder called PTz columns) and commercial columns (TSKgel Amide-80, Halo-HILIC) are shown in Table 2. For uridine retention k(U), the columns of the examples had values of k(U)=4.562 to 8.944. These values were at least equivalent to, and in some cases much greater than, the value of k(U)=4.58 for TSKgel Amide-80, which has the greatest retention of the commercial columns. The value of α(OH) representing the degree of hydrophilic selectivity was 1.927 to 2.25. Thus, the PTz columns appear to have extremely high retention and selectivity for uridine and other hydrophilic substances. The α(Tb/Tp) values were 1 or greater, which is indicative of an acidic separating medium. FIG. 3 shows the results of a comparison of the k(U) values of the columns of the examples with those of the commercial columns.

TABLE 1

| Column test items | | |
|---|---|---|
| k(U) | k(uridine) | standard retention |
| α(CH$_2$) | k(uridine)/k(5-methyluridine) | hydrophobic selectivity |
| α(OH) | k(uridine)/k(2'-deoxyuridine) | hydroxy groups selectivity |
| α(V/A) | k(vidarabine)/k(adenosine) | configurational selectivity |
| α(AX) | k(sodium p-toluenesulfonate)/k(uridine) | anion-exchange property |
| α(CX) | k(N,N,N-trimethylphenylammonium chloride)/k(uridine) | cation-exchange property |
| α(Tb/Tp) | k(theobromine)/k(theophylline) | pH on the surface of stationary phases |

TABLE 2

Results of column test of separating media of the invention, separating medium without functionalization by (meth) acrylic polymer, and commercially available columns.

| | k (U) | α (CH$_2$) | α (OH) | α (V/A) | α (AX) | α (CX) | α (Tb/Tp) |
|---|---|---|---|---|---|---|---|
| MAS-Si | 0.104 | 1.000 | 1.019 | 1.393 | −0.562 | 5.423 | 1.134 |
| PTz (80 mg/mL) | 4.562 | 1.339 | 1.927 | 1.312 | 0.108 | 1.129 | 1.000 |
| PTz (120 mg/mL) | 6.870 | 1.409 | 2.095 | 1.313 | 0.092 | 0.879 | 1.139 |
| PTz (160 mg/mL) | 8.498 | 1.455 | 2.187 | 1.321 | 0.082 | 0.813 | 1.182 |
| PTz (260 mg/mL) | 8.944 | 1.489 | 2.249 | 1.323 | 0.068 | 0.775 | 1.312 |
| TSKgel Amide-80 (3 μm) | 4.580 | 1.270 | 1.640 | 1.280 | 0.410 | 2.750 | 1.320 |
| Halo-HILIC (2.7 μm) | 0.640 | 1.080 | 1.160 | 1.180 | 0.640 | 29.030 | 1.260 |

4. Comparison with Commercial Columns

The separation performance of 3 columns, a PTz column (example), TSK gel Amide-80 (5 μm) and Halo-HILIC, were compared using 8 kinds of nucleic acids and nucleobases as samples.

<Results and Discussion>

Figure 4:
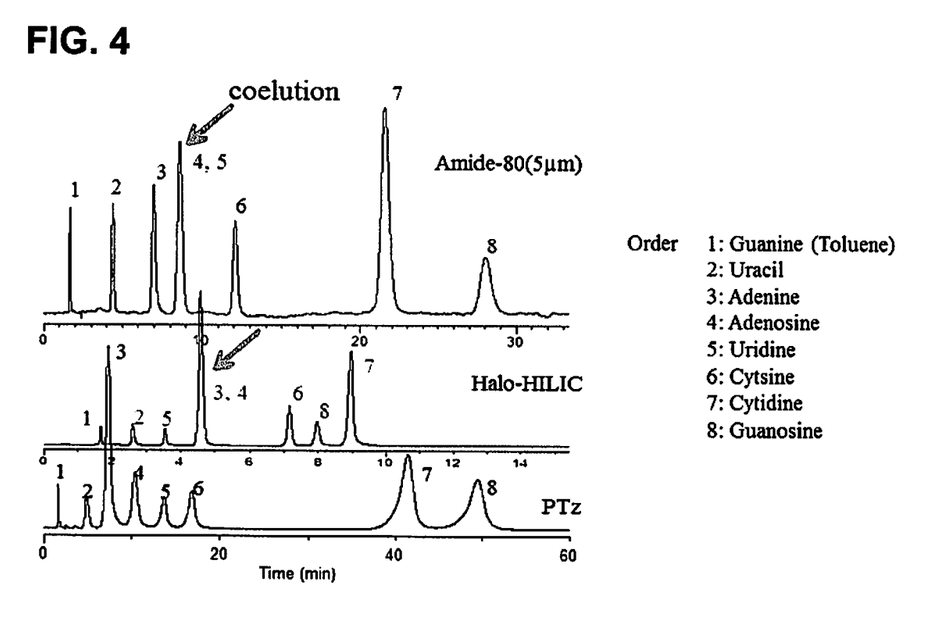
FIG. 4 shows separation results (chromatograms) for 8 kinds of nucleic acid derivatives and other hydrophilic compounds using columns packed with the separating medium of the invention and commercially available separating medium.

FIG. 4 shows the results of a comparison of separating performance for 8 kinds of samples (Guanine, Guanosine, Uracil, Uridine, Adenine, Adenosine, Cytosine, Cytidine).
Measurement Conditions
  Mobile phase: ACN/20 mM AcONH$_4$ buffer=90/10
  Detector: UV 254 nm
  Column temperature: 30° C.

As shown in the chromatograms of FIG. 4, Adenosine and Uridine could not be separated with the Amide-80 (5 μm) because they were eluted simultaneously, and the same was true of Adenine and Adenosine with the Halo-Hilic. By contrast, only the PTz column was able to separate all of the 8 different compounds. This confirms that a PTz column has strong separation performance with respect to hydrophilic compounds such as nucleosides and nucleic acids.

<Reference Example: Classification of Columns (Comparison with Commercial Columns)>

Using the specimens used in the column testing, columns can be classified by plotting the values for log k(U) (logarithmic value of k(uridine)) and log k(TMPAC) (logarithmic value of k(trimethylphenylammonium chloride).

The advantage of this method is that it is easy to implement and allows a column of unknown properties to be provisionally classified using only two samples. The values for 15 commercial columns (see FIG. 5) and PTz columns were plotted.

<Results>

Figure 5:
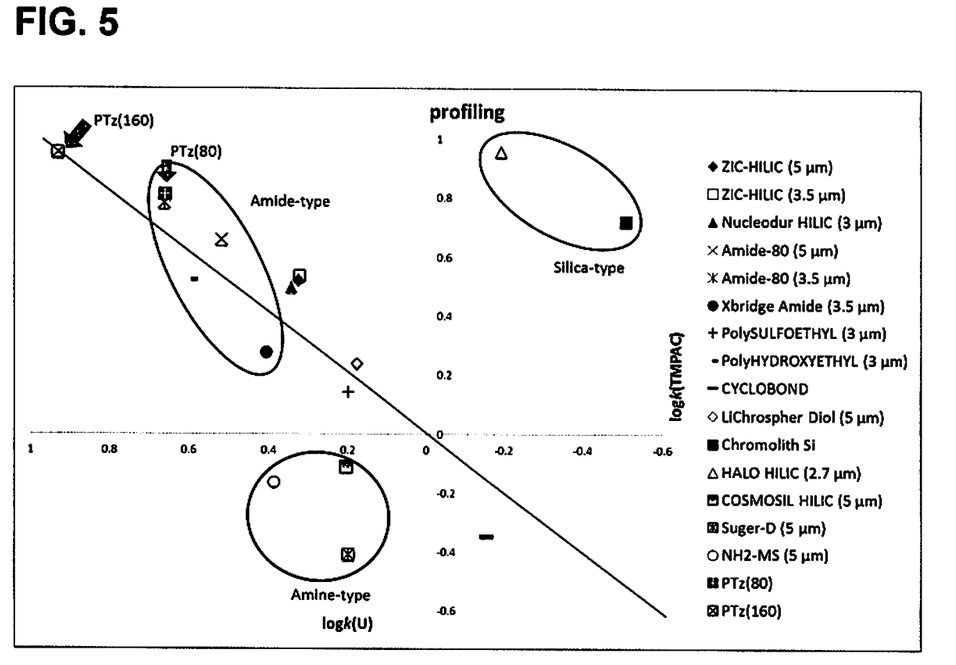
FIG. 5 shows a plot of log k(U) and log k(TMPAC) values for columns packed with the separating medium of the invention and commercially available columns.

FIG. 5 shows plotting results for log k(U) and log k(TMPAC). As can be seen from this, the commercial columns can be classified into amine, silica and amide types and the like. In this context, the PTz columns have properties similar to those of the amide columns.

The (meth)acrylamide monomers shown in Table 3 below were prepared by the same methods as in 1 above. However, in the reactions using 3-amino-1,2,4-triazole and 5-amino-1H-tetrazole as starting materials, the reaction was performed with a water solvent alone without tetrahydrofuran, and potassium bicarbonate was used as a base. Formation of these monomers was confirmed by $^1$H NMR and MS, and consistent results were obtained.

[Table 3]

TABLE 3

Structures of (meth)acrylamide monomers (IUPAC name (top) and abbreviation (bottom))

| IUPAC name and Abbreviation | Structure |
|---|---|
| N-(thiazol-2-yl)methacrylamide MA thiazole | |
| N-(1,3,4-thiadiazol-2-yl)methacrylamide MA thiadiazole | |
| N-(4H-1,2,4-triazol-3-yl)methacrylamide MA triazole | |
| N-(1H-tetrazol-5-yl)acrylamide AA tetrazole | |

Silica gel particles modified with the 3-methacrylamidopropyltriethoxysilane (MAS) prepared in 2-1 above and the (meth)acrylamide monomers described in Table 3 above in silica gel particle form were polymerized under the conditions described in Table 4 below. Because the monomers and polymers of MA thiazole and MA thiadiazole had low water solubility, polymerization was performed in dimethylformamide (DMF), which dissolves all monomers.

TABLE 4

Polymerization conditions*

| Monomer | Monomer (mg) | APS† (mL) | DMF (mL) | Pyridine (mL) | MAS-Silica (mg) |
|---|---|---|---|---|---|
| MA thiazole | 965 | 1 | 4 | 0 | 700 |
| MA thiadiazole | 968 | 1 | 4 | 0 | 700 |
| MA triazole | 882 | 1 | 4 | 0 | 699 |
| MA tetrazole | 799 | 1 | 3 | 1 | 700 |
| AA tetrazole | 384 | 1 | 4 | 0 | 700 |

*Polymerization temperature 60° C., polymerization time 3 hours in all cases.
+Using 5 mg of APS (ammonium persulfate) dissolved in 1 mL of water-DMF (3:7, v/v)

<Results and Discussion>

Table 5 shows the results of column testing using columns of the examples (hereunder called PTz columns) and commercial columns (TSKgel Amide-80, Halo-HILIC). TSKgel Amide-80 is a polyacrylamide modified column, and Halo-HILIC is an unmodified silica column.

TABLE 5

Results of column testing of separating media of the invention and commercially available columns

| Monomer | k (U) | α (CH2) | α (OH) | α (V/A) | α (AX) | α (CX) | α (Tb/Tp) |
|---|---|---|---|---|---|---|---|
| MA thiazole | 0.81 | 1.08 | 1.45 | 1.24 | 1.04 | 0.77 | 1.04 |
| MA thiadiazole | 0.47 | 1.11 | 1.39 | 1.28 | 1.34 | 1.11 | 0.75 |
| MA triazole | 0.40 | 1.12 | 1.28 | 1.29 | 1.79 | 1.63 | 0.61 |
| MA tetrazole | 5.15 | 1.41 | 2.11 | 1.29 | 0.13 | 0.78 | 1.15 |
| AA tetrazole | 0.57 | 1.18 | 1.43 | 1.30 | 1.24 | 1.53 | 0.68 |
| Amide-80 | 4.58 | 1.27 | 1.64 | 1.28 | 0.41 | 2.75 | 1.32 |
| Halo-HILIC | 0.64 | 1.08 | 1.16 | 1.18 | 0.64 | 29.03 | 1.26 |

For uridine retention k(U), values of k(U)=0.40 to 0.57 were obtained for columns using the monomers listed in Table 4 (excluding MA tetrazole). These values are low in comparison with the value of k(U)=5.15 for the column using MA tetrazole polymerized at the same time, meaning that hydrophilicity was not high, but sufficient for use as a separating medium for hydrophilic chromatography. The α(Tb/Tp) values, which show the pH condition of the stationary phase surface, were 1 or less for MA thiadiazole, MA triazole and AA tetrazole, indicating that the surface of a stationary phase modified with these monomers is basic.

The stationary phase using MA tetrazole had a α(Tb/Tp) value of 1 or more, similar to that obtained by polymerization in water, so this appears to be an acidic separating medium.

The AA tetrazole stationary phase had a α(Tb/Tp) value of 0.68, indicating basic properties.

Figure 6:
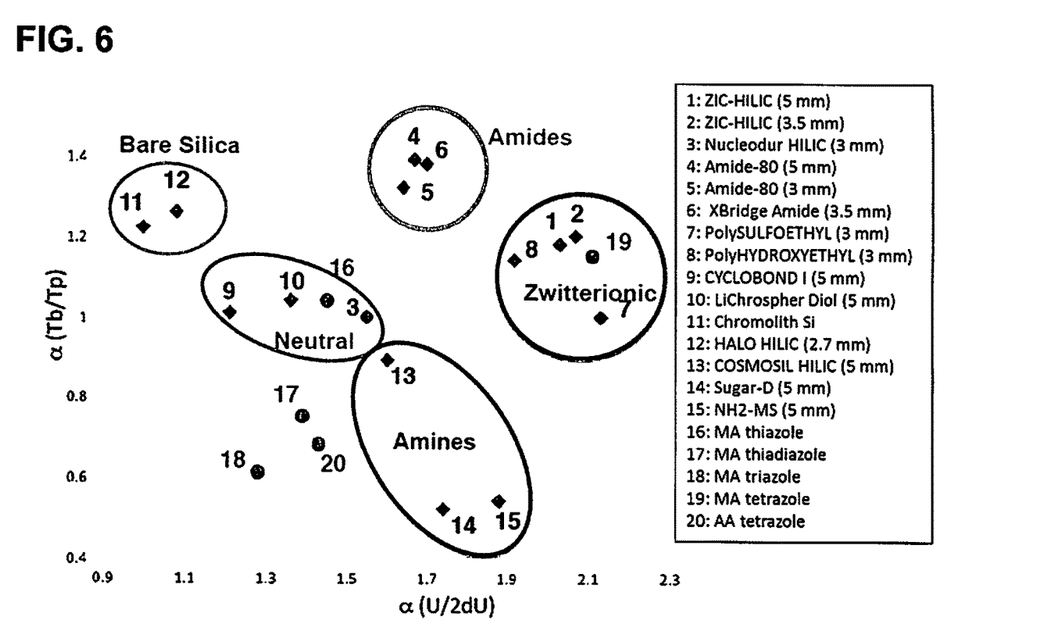
FIG. 6 shows a plot of α(Tb/Tp) and α(U/2dU) values for columns packed with the separating medium of the present invention (using different (meth)acrylamide monomers) and commercially available columns.

Next, the values of α(OH) and α(Tb/Tp) for each column were plotted on the horizontal axis and vertical axis, respectively, as shown in FIG. 6. A α(Tb/Tp) value near 1 indicates a neutral surface, one above 1 an acidic surface, and one below 1 a basic surface. The higher the α(OH) value, the greater the hydroxyl selectivity, and hydrophilicity tends to be greater in the upper right part of the plot. Nos. 16 to 20 correspond to phases prepared using the monomers listed in Table 4.

A neutral to weakly basic HILIC stationary phase can be prepared by polymerization modification with MA thiazole or MA thiadiazole, while a basic HILIC stationary phase can be prepared by polymerization modification with MA triazole. Under the conditions used in Table 3, the plot position of the MA tetrazole modified column remained in zwitterionic region, but with the k(U)=10 MA tetrazole modified column the plot position appeared in the upper right region.

Figure 7:
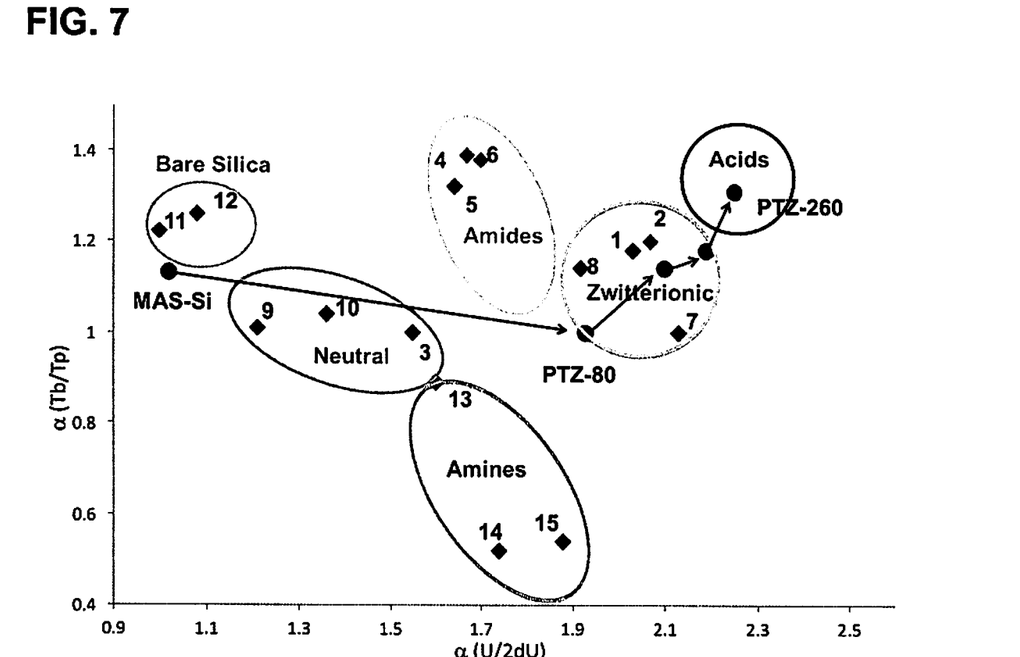
FIG. 7 shows a plot of α(Tb/Tp) and α(U/2dU) values for columns packed with the separating medium of the present invention (using different concentrations of 5-methacrylamido-1H-tetrazole) and commercially available columns.

For the PTz columns prepared in Example 1, FIG. 7 shows the separation properties at each monomer concentration. The vertical and horizontal axes are as in FIG. 6, and the symbols and numbers have the same meaning as in FIG. 6. It can be seen from the results shown in FIG. 7 that the hydrophilicity and selectivity of the PTz columns increased by raising the monomer concentration.

Example 2

Integrated Support (Monolithic Column)

1. Preparation of Porous Monolithic Silica Column

A porous silica monolith was prepared by known methods. Specifically, this was accomplished by a sol-gel process caused by hydrolysis and polycondensation of an alkoxysilane.

2. Inner Wall Treatment of Fused Silica Capillary 1N-sodium hydroxide was supplied to a 100 μm I.D.×375 μm O.D. fused silica capillary column (Polymicro Technologies), and left for 3 hours at 40° C. This was then washed with 1N-hydrochloric acid, and left for 3 hours at 40° C. Finally, this was washed successively with ultrapure water and acetone, and dried.

3. Preparation of Hybrid Monolithic Silica Capillary Column 20 ml of 0.01 N acetic acid was added with ice cooling to 0.9 g of polyethylene glycol (PEG) and 2 g of urea, and stirred for 30 minutes. 9 ml of an alkoxysilane mixture (3:1 vol/vol) of tetramethoxysilane and methyltrimethoxysilane was added dropwise, and stirred for 30 minutes. After being heated for 10 minutes at 40° C., the mixture solution was then filtered with a PTFE filter (0.45 μm). This mixture solution was poured into the inner wall treated fused silica capillary, and gelled by reacting it for 24 hours at 40° C. Next, this capillary was heat aged (24 hours) at 90° C. with both ends immersed in 0.06 g/ml urea solution, and then heat treated for 4 hours at 120° C. The heat treatment served to re-bond the backbone, while the ammonia generated by decomposition of the urea served to dissolve the silica, forming mesopores. The inside of the capillary was then washed with methanol. Finally, the inside of the capillary was thoroughly dried and heat-treated to obtain a monolithic silica capillary column.

4. Silylation of Monolithic Silica Capillary Column with MAS

A mixed solution of MAS, toluene and pyridine (volume ratio 1:1:1) was delivered for 24 hours with a syringe pump to a monolithic silica capillary column substituted with methanol and toluene (reaction temperature 80° C.). The inside of the capillary was then washed with toluene. The same operation was repeated to modify the monolithic silica capillary column with MAS.

5. Preparation of Polymerization Modified Stationary Phase

A sufficient amount of a monomer (same as that prepared in Example 1) solution containing a polymerization initiator was supplied at room temperature to a MAS column previously substituted with water, filling the column with the monomer solution. The column with both ends tightly sealed was then placed in a water bath set to the polymerization temperature of both (60° C.), and polymerized for a specific amount of time. Finally, water or methanol was supplied with an HPLC pump to wash the inside of the capillary and thereby obtain a polymerization modified monolithic silica capillary column. The structure of the monomer is shown in FIG. 1, and the polymerization conditions are given below.

Conditions for preparation of polymerization modified stationary phase
Monomer concentration: 150 mg/ml
Reaction time: 2 hr
Initiator: 5 mg (ammonium persulfate/1% NH$_3$ aq. in water
Measurement Conditions
Same conditions as in Example 1

TABLE 6

Results of column testing of monolithic column

| | k (U) | α (CH$_2$) | α (OH) | α (V/A) | α (AX) | α (CX) | α (Tb/Tp) |
|---|---|---|---|---|---|---|---|
| Ptz (monolith) | 3.85 | 1.41 | 2.25 | 1.41 | 0.00 | 8.44 | 1.45 |

<Preparation of Monolithic Column-2>

The MAS-modified monolithic silica capillary column prepared in 4 of Example 2 was filled with a monomer solution prepared under the following conditions, and a polymerization reaction was performed inside the column at different monomer concentrations as shown in Table 7 below to obtain respective monolithic columns.

Initiator: Ammonium persulfate (5 mg/ml in 4.1 mol/l $NH_3$ aq)

Temperature: 60° C.

Reaction time: 2 hr

Because the polymer produced by polymerization of this monomer is highly soluble in water or MeOH, the chargeable amount of the monomer is relatively large. Using this wide range of chargeable amounts, therefore, in this test the column performance (retention and selectivity) was evaluated with different charged amounts of the monomer. The results are shown in Table 7.

TABLE 7

| [M] mg/ml | k (uridine) | α (CH2) | α (OH) | α (Tb/Tp) | α (V/A) | α (2dG/3dG) | k (TPA) |
|---|---|---|---|---|---|---|---|
| 200 | 3.69 | 1.54 | 2.57 | 1.41 | 1.33 | 1.05 | 33.5 |
| 150 | 1.91 | 1.38 | 1.91 | 1.45 | 1.29 | 1.05 | 24.6 |
| 100 | 1.24 | 1.27 | 1.64 | 1.33 | 1.33 | 1.06 | 21.4 |
| 20 | 0.41 | 1.17 | 1.31 | 1.17 | 1.36 | 1.04 | 9.8 |

Figure 8:
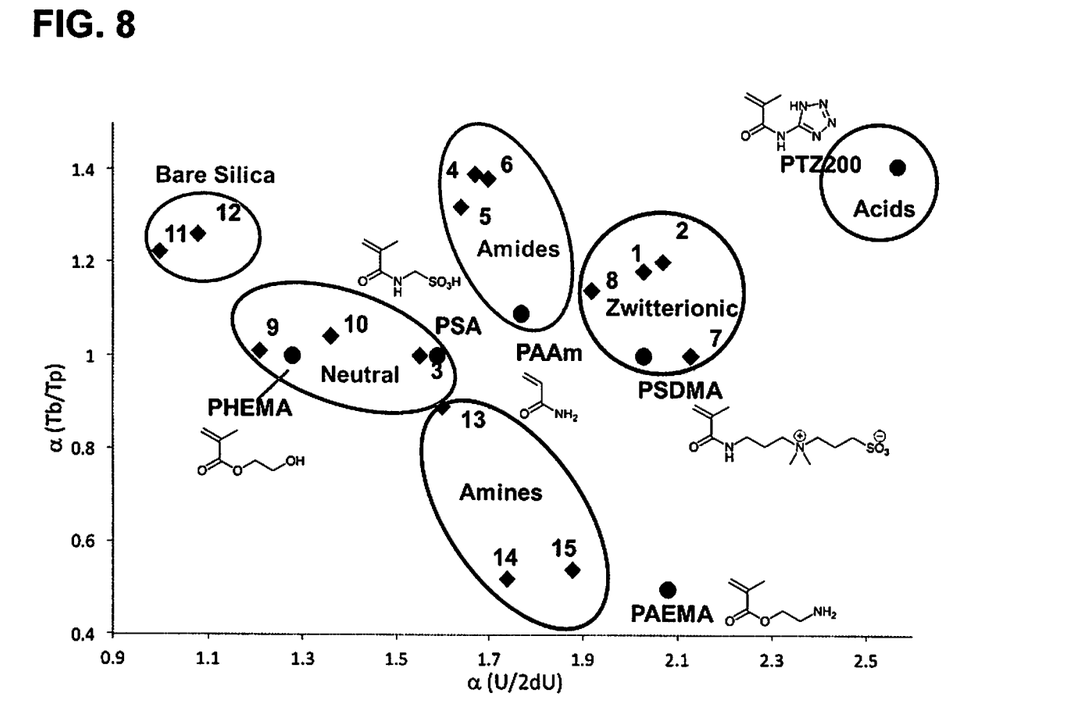
FIG. 8 shows a plot of α(Tb/Tp) and α(U/2dU) values for the separating medium of the invention (monolith column) and commercial and comparison columns.

Chromatography Conditions:

Mobile phase: AN90%-20 mM $AcONH_4$ buffer pH 4.7, Flow rate: 0.5 ml/min, Pressure: 12 kgf, temperature: 30° C., Detection: 254 nm, Sample: α(CH2): k(uridine)/k(5-methyluridine), α(OH): k(uridine)/k(2'-deoxyluridine), α(Tb/Tp): k(theobromine)/k(theophylline), α(V/A): k(vidarabine)/k(adenosine), α(2dG/3dG): k(2'-deoxyguanosine)/k(3'-deoxyguanosine), k(TMPAC): N,N,N-trimethylphenylammonium chloride The separation properties were compared using the monolithic column prepared above with a monomer concentration of 200 mg/ml (PTZ-200) and various monolithic HILIC columns and particle packed columns. The chromatography conditions and samples for separation were as in Table 7. The results are shown in Table 8 and FIG. 8. The vertical and horizontal axes in FIG. 8 are same as in FIG. 6. The symbols and numbers in the figures also have the same meaning as in FIG. 6. The structures of the PSDMA, PAAm and PAEMA monomers listed in Table 8 are shown in FIG. 8.

The greatest retention was obtained with the PTZ-200 monolithic column (polymerization modified monolithic column) of the present invention. In comparison with the particle packed columns, its retention performance was 1.75 times that of the ZIC-HILIC, 1.51 times that of the NH2-MS and 0.8 times that of the Amide-80. Considering the porosity of the monolithic column, it appears that extremely high retention is obtained with a PTZ-200 column. It can be said that this feature more than compensates for the low retention performance that is a weak point of monolithic columns.

In terms of selectivity, the PTZ-200 column exhibited characteristic values in comparison with other columns. It had the highest values for hydrophilic selectivity, and the values for hydrophobic selectivity were also relatively high. Other columns had higher results in terms of OH group rotation and positional selectivity.

Figure 9:
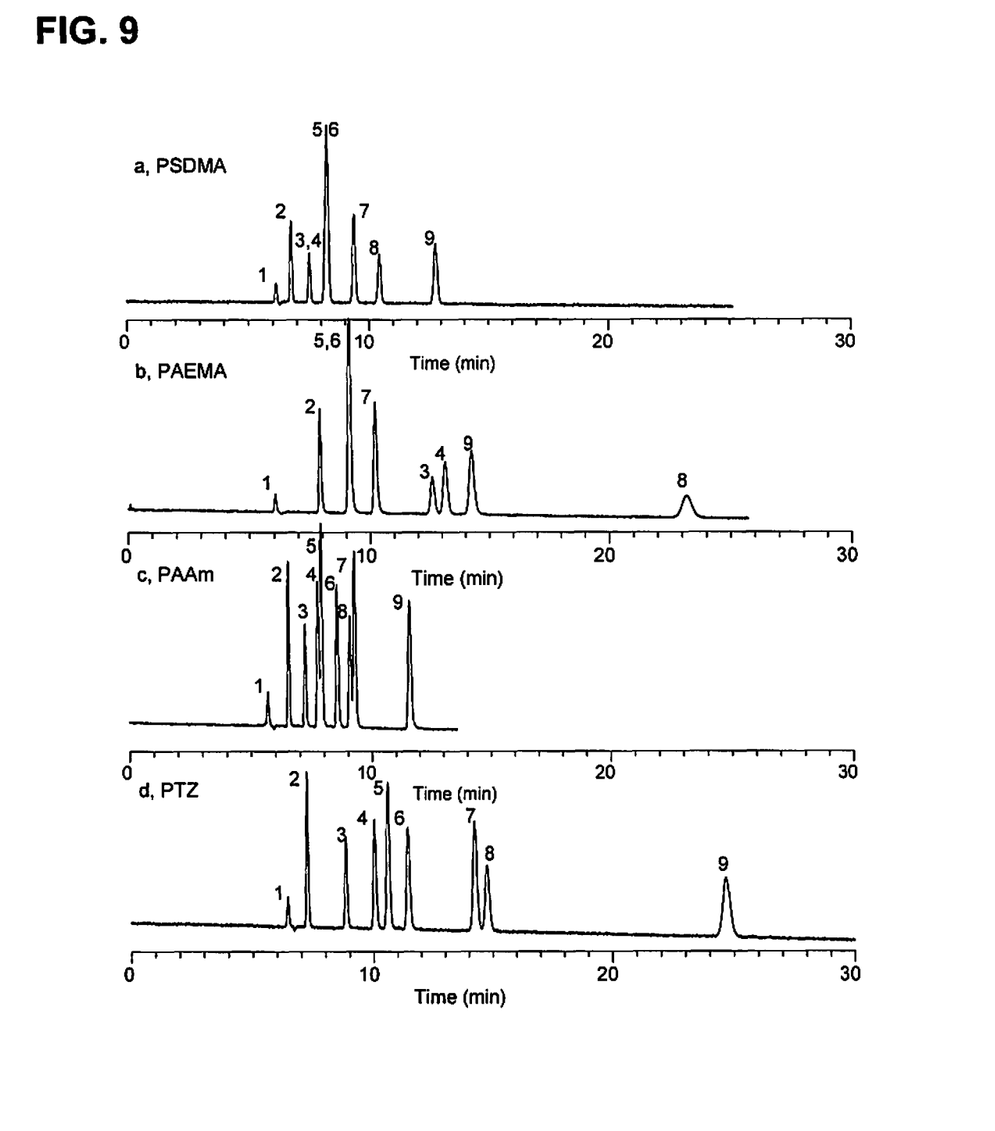
FIG. 9 shows chromatograms obtained by using the separating medium of the invention (monolithic column) and comparison columns to separate fluorouracil compounds.

Fluorouridine derivatives were also separated using a column with a different monomer concentration (PTZ-150) and columns prepared using the PSDMA, PAEMA and PAAm listed in Table 8 above. The compounds targeted for separation have extremely similar structures, and are generally very difficult to separate at the same time. The results are shown in FIG. 9.

The chromatography conditions and compounds targeted for separation were as follows.

Mobile phase: AN90% 20 mM $AcONH_4$ buffer, Column: a: PSDMA 26 cm, b: PAEMA 26 cm, c: PAAm 25 cm, d: PTZ-150 26.7 cm, Flow rate: 0.5 ml/min, Pressure: 15 kgf, temperature: 30° C., Detection: 254 nm Sample 1: toluene, 2: trifluorothymidine, 3: 5'-deoxy-5-fluorouridine, 4: 2'-deoxy-5-fluorouridine, 5: 2'-deoxy-2'-fluorouridine, 6: thymidine, 7: 2'-deoxyuridine, 8: 5-fluorouridine, 9: uridine It can be seen from the results of FIG. 9 that not all of the compounds could be separated with PSDMA or PAEMA. All of the peak tops were confirmed with PAAm, but samples 4, 5, 6 and 7 could not be completely separated from each other. However, the PTZ-150 column was able to completely separate all the compounds. This is one example of separation achieved due to the high retention and good selectivity that are characteristic of PTZ.

In the present invention, a new separating medium was developed by modifying a support such as silica gel through polymerization of monomer having a structure derived from the compound represented by Formula (I). In the columns packed with the separating media developed in the present invention, the separating medium with supported MA tetrazole produced a weakly acidic column that exhibited

TABLE 8

| Column | k (uridine) | α (CH2) | α (OH) | α (Tb/Tp) | α (V/A) | α (2dG/3dG) | k (TSA) | k (TPA) |
|---|---|---|---|---|---|---|---|---|
| PTZ-200 | 3.69 | 1.54 | 2.57 | 1.41 | 1.33 | 1.05 | — | 33.50 |
| PSDMA | 1.10 | 1.60 | 2.03 | 1.00 | 1.60 | 1.08 | 0.66 | 0.67 |
| PAAm | 0.93 | 1.30 | 1.77 | 1.09 | 1.70 | 1.06 | 0.59 | 0.38 |
| PAEMA | 1.30 | 1.50 | 1.90 | 0.50 | 1.40 | 1.07 | 8.60 | — |
| ZIC-HILC 3.5 μm | 2.11 | 1.71 | 2.07 | 1.20 | 1.51 | 1.12 | 0.11 | 4.33 |
| Amide-80 3 μm | 4.58 | 1.27 | 1.64 | 1.32 | 1.28 | 1.08 | 0.26 | 2.82 |
| NH2-MS 5 μm | 2.44 | 1.30 | 1.88 | 0.54 | 1.36 | 1.07 | 18.40 | — | extremely good characteristics in terms of uridine retention and hydrophilic selectivity. Of the separating medium of the present invention, a column using a separating medium with supported MA tetrazole in particular had extremely high selectivity and retention of hydrophilic substances in comparison with commercial columns, and excellent ability to separate nucleosides and nucleobases.

INDUSTRIAL APPLICABILITY

It is expected that the separating medium of the present invention will be highly useful for separating hydrophilic compounds that have been difficult to separate in the past. Thus, it is expected that a column using the separating medium of the invention will contribute not only to the future discovery and improvement of new separation conditions for biological substances (including sugars, peptides and proteins), but also to more convenient identification and analysis of the separated biological substances.

The invention claimed is:

1. A separating medium for hydrophilic interaction chromatography, being formed from a support and a ligand supported on the support, wherein
the ligand is supported on the support by physical adsorption or chemical bonding, and
the ligand is a (meth)acrylic polymer having a constituent unit derived from a compound represented by Formula (I) below:

(I)

in Formula (I), there are one or two double bonds between atoms making up the heterocyclic ring, $X_1$ is selected from the group consisting of S, $SCH_3^+$, O, NH, $NCH_3$, $CH_2$, CHR and $CR_1R_2$, each of $X_2$, $X_3$ and $X_4$ is selected from the group consisting of N, NH, $NCH_3$, $CH_2$, CHR, $NCH_3^+$, CH, CR and $CR_1R_2$, wherein each of $R_1$ and $R_2$ is an optionally substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group, while R is a substituted or non-substituted $C_{1-18}$ alkyl, $C_{6-18}$ aryl, $C_{2-18}$ alkenyl, $C_{2-18}$ alkynyl, $C_{7-18}$ aralkyl, $C_{2-18}$ acyl, $C_{3-18}$ cycloalkyl, carboxyl, amino, $C_{6-18}$ aryloxy or $C_{1-18}$ alkoxy, halo, hydroxyl, nitro or cyano group, at least two of $X_1$, $X_2$, $X_3$ and $X_4$ are not $CH_2$, CH, CR or $CR_1R_2$, and $R_3$ is H or $CH_3$.

2. The separating medium according to claim 1, wherein the ligand is a (meth)acrylic polymer having a constituent unit derived from a compound selected from the group consisting of aminoimidazole, aminoimidazoline, aminotriazole, aminotriazole, aminotetrazole, aminothiadiazole and aminomethylimidazole.

3. The separating medium according to claim 1, wherein the ligand is a (meth)acrylic polymer having a constituent unit derived from aminotetrazole.

4. The separating medium according to claim 1, wherein the ligand is a methacrylic polymer having a constituent unit derived from aminotetrazole.

5. The separating medium according to claim 1, wherein the support is a silica gel or silica monolith.

* * * * *